United States Patent
Mumick et al.

(10) Patent No.: US 9,185,227 B2
(45) Date of Patent: Nov. 10, 2015

(54) SENDER DRIVEN CALL COMPLETION SYSTEM

(71) Applicant: Kirusa, Inc., New Providence, NJ (US)

(72) Inventors: Inderpal Singh Mumick, Berkely Heights, NJ (US); Surinder Singh Anand, Highland Park, NJ (US); Raja N. Moorthy, Fairless Hills, PA (US)

(73) Assignee: Kirusa, Inc., New Province, NJ (US)

( * ) Notice: Subject to any disclaimer, the term of this patent is extended or adjusted under 35 U.S.C. 154(b) by 0 days.

(21) Appl. No.: 14/105,158

(22) Filed: Dec. 12, 2013

(65) Prior Publication Data
US 2014/0169539 A1    Jun. 19, 2014

Related U.S. Application Data

(60) Provisional application No. 61/737,274, filed on Dec. 14, 2012.

(51) Int. Cl.
*H04M 1/64* (2006.01)
*H04M 3/533* (2006.01)
*H04W 4/00* (2009.01)

(52) U.S. Cl.
CPC .................................... *H04M 3/533* (2013.01)

(58) Field of Classification Search
CPC .......... H04M 1/274575; H04W 28/04; H04W 76/02; H04W 76/06; H04W 84/042
USPC ..................... 379/88.01–88.23; 455/465, 466
See application file for complete search history.

(56) References Cited

U.S. PATENT DOCUMENTS

| | | | |
|---|---|---|---|
| 5,627,875 A * | 5/1997 | Kapsales | 455/567 |
| 6,064,874 A | 5/2000 | Cox et al. | |
| 6,577,881 B1 * | 6/2003 | Ehara | 455/563 |
| 7,020,269 B1 * | 3/2006 | Park et al. | 379/355.01 |
| 8,880,120 B1 * | 11/2014 | Lavian et al. | 455/556.1 |
| 2002/0101970 A1 * | 8/2002 | Contractor | 379/209.01 |
| 2003/0112945 A1 | 6/2003 | Brown et al. | |
| 2003/0119520 A1 * | 6/2003 | Yoshioka et al. | 455/456 |
| 2004/0086100 A1 * | 5/2004 | Moore et al. | 379/201.01 |
| 2006/0013195 A1 * | 1/2006 | Son et al. | 370/352 |
| 2006/0104429 A1 | 5/2006 | Wouterse et al. | |
| 2006/0242588 A1 * | 10/2006 | Ybarra et al. | 715/748 |
| 2007/0047695 A1 * | 3/2007 | Tal et al. | 379/67.1 |
| 2009/0143085 A1 * | 6/2009 | Anderl et al. | 455/466 |
| 2010/0296644 A1 | 11/2010 | Pisani et al. | |

* cited by examiner

*Primary Examiner* — Solomon Bezuayehu
(74) *Attorney, Agent, or Firm* — Ash Tankha; Lipton, Weinberger & Husick

(57) ABSTRACT

A method and a system for completing an incomplete call made by a calling party to a called party, provide a call completion application on a calling party device. The call completion application detects an incomplete call, which is a call that is not connected to a called party device or a short duration call that does not enable an intended communication to occur between the calling party and the called party. The call completion application determines one or more call completion actions, for example, setting a reminder, transmitting media data, etc., to be performed to complete the incomplete call, for example, based on user selections, a duration of the incomplete call, user configuration of the call completion application on the calling party device, etc. The call completion application triggers execution of the determined call completion actions based on one or more action execution criteria for completing the incomplete call.

23 Claims, 8 Drawing Sheets

DETECTION OF AN UNANSWERED CALL ATTEMPT ON A CALLING PARTY DEVICE WITH AN ANDROID™ OPERATING SYSTEM COMPRISES THE FOLLOWING STEPS:

A. DETECT THE CHANGE OF STATE OF THE ANDROID CALLING PARTY DEVICE BETWEEN THE FOLLOWING: IDLE, OFF_HOOK, AND RINGING USING onCallStateChanged() TO REQUEST THE ANDROID™ OPERATING SYSTEM TO ISSUE A CALLBACK TO THE CALL COMPLETION APPLICATION ON THE ANDROID CALLING PARTY DEVICE.

B. THE FOLLOWING CHANGE OF CALL STATES RELATE TO INCOMING CALLS (MISSED OR ANSWERED) THAT CAN BE IGNORED BY THE CALL COMPLETION APPLICATION:

I. IDLE TO RINGING TO IDLE: AN INCOMING CALL THAT WAS NOT ANSWERED.

II. IDLE TO RINGING TO OFF_HOOK TO IDLE: AN INCOMING CALL THAT WAS ANSWERED AND THEN ENDED.

III. IDLE TO RINGING TO OFF_HOOK TO RINGING TO OFF_HOOK TO IDLE: AN INCOMING CALL THAT WAS ANSWERED FOLLOWED BY ANOTHER INCOMING CALL (WHICH MAY OR MAY NOT HAVE BEEN ANSWERED), AND FINALLY THE CALL ENDS.

C. THE FOLLOWING CHANGE OF CALL STATES REPRESENTS AN OUTGOING CALL ATTEMPT THAT MAY OR MAY NOT HAVE BEEN ANSWERED.

I. IDLE TO OFF_HOOK TO IDLE: AN OUTGOING CALL ATTEMPT.

II. TO DIFFERENTIATE BETWEEN CALLS THAT ARE ANSWERED AND UNANSWERED, FETCH THE LAST ENTRY FOR OUTGOING CALLS FROM THE CALL LOG USING THE CallLog.getLastOutgoingCall. CHECK THE VALUE OF THE "DURATION" FIELD IN THE CALL LOG. IF THE VALUE OF DURATION IS 0, IT INDICATES THAT THE CALL WAS NOT ANSWERED.

FIG. 3

DETECTION OF AN UNANSWERED CALL ATTEMPT ON A CALLING PARTY DEVICE WITH AN iOS® MOBILE OPERATING SYSTEM COMPRISES THE FOLLOWING STEPS:

A. REGISTER THE CALL COMPLETION APPLICATION WITH THE iOS USING callEventHandler() TO BE NOTIFIED ABOUT ANY CHANGE IN THE CALL STATE.

B. DETECT THE CHANGE OF STATE OF THE iOS CALLING PARTY DEVICE BETWEEN THE FOLLOWING: CTCallStateDisconnected, CTCallStateDialing, CTCallStateConnected, AND CTCallStateIncoming.

C. THE FOLLOWING CHANGE OF CALL STATES RELATE TO INCOMING CALLS (MISSED OR ANSWERED) THAT CAN BE IGNORED BY THE CALL COMPLETION APPLICATION:

I. CTCallStateDisconnected TO CTCallStateIncoming TO CTCallStateDisconnected: AN INCOMING CALL THAT WAS NOT ANSWERED.

II. CTCallStateDisconnected TO CTCallStateIncoming TO CTCallStateConnected TO CTCallStateDisconnected: AN INCOMING CALL THAT WAS ANSWERED AND THEN ENDED.

III. CTCallStateDisconnected TO CTCallStateIncoming TO CTCallsStateConnected TO CTCallStateIncoming TO CTCallStateConnected TO CTCallStateDisconnected. AN INCOMING CALL THAT WAS ANSWERED, FOLLOWED BY ANOTHER INCOMING CALL (WHICH MAY OR MAY NOT HAVE BEEN ANSWERED), AND FINALLY THE CALL ENDS.

D. THE FOLLOWING CHANGE OF CALL STATES REPRESENTS AN OUTGOING CALL ATTEMPT THAT HAS BEEN ANSWERED.

I. CTCallStateDisconnected TO CTCallStateDialing TO CTCallStateConnected TO CTCallStateDisconnected: AN OUTGOING CALL THAT WAS ANSWERED.

E. THE FOLLOWING CHANGE OF CALL STATES REPRESENTS AN OUTGOING CALL ATTEMPT THAT HAS NOT BEEN ANSWERED.

I. CTCallStateDisconnected TO CTCallStateDialing TO CTCallStateDisconnected: AN OUTGOING CALL ATTEMPT THAT WAS NOT ANSWERED.

FIG. 4

LIST OF CALL COMPLETION ACTIONS AVAILABLE TO THE CALLING PARTY:

1. SEND A TEXT MESSAGE
2. SEND A VOICE MESSAGE
3. SEND A VIDEO MESSAGE
4. SEND A PRE-RECORDED MESSAGE
5. SEND A MISSED CALL ALERT
6. BE ALERTED WHEN THE CALLED PARTY IS AVAILABLE
7. ADD TO REMINDER
8. ADD TO CALENDAR
9. SEND A DIRECT MESSAGE ON TWITTER
10. POST TO THE CALLED PARTY'S FACEBOOK PAGE
11. SEND A PRIVATE CHAT MESSAGE TO THE CALLED PARTY'S FACEBOOK IDENTITY

FIG. 5

SENDER DRIVEN CALL COMPLETION SYSTEM

CROSS REFERENCE TO RELATED APPLICATIONS

This application claims priority to and the benefit of provisional patent application No. 61/737,274 titled "Sender Driven Call Completion System", filed in the United States Patent and Trademark Office on Dec. 14, 2012. The specification of the above referenced patent application is incorporated herein by reference in its entirety.

BACKGROUND

Call completion systems such as voicemail are widely prevalent in Europe, the United States of America (USA), etc., both within a network and out of the network and have been used for a number of applications, for example, for sending voice messages and voice related information in the case of incomplete calls. A conventional call completion system typically relies on a preconfigured establishment of a feature in the network of a called party to receive a message on behalf of the called party who is a recipient of a call. Consider an example where a calling party originates a voice call, or attempts to place a voice call to a called party. In a conventional call completion system, the phone number and the network of the called party is configured such that if a calling party attempts to establish a voice call with the called party and the called party does not accept the voice call, the calling party is offered an option to record and send a voice message, or alternatively, a short message service (SMS) message, etc., automatically to the called party indicating that the called party missed a call. However, this call completion service can operate only when the network is set up on behalf of the called party. The network needs to configure the call completion service on behalf of the called party to enable the calling party to send a message to the called party. The configuration of the call completion service is typically triggered manually by the called party or performed automatically by the network for the called party. That is, the configuration of the call completion service involves a configuration of a set of parameters corresponding to a contact number of the called party before the calling party is offered an option to send a message.

Such conventional call completion solutions, for example, voicemail, are often insufficient since the calling party does not get to decide on whether a voice message can be sent to the called party, that is, the calling party is dependent on the called party having enabled a voice message service for receipt of voice messages. Furthermore, all message transactions need to be mandatorily performed via the network. Therefore, if the network fails to configure a message service for the called party, the called party is unable to receive a message from the calling party.

Hence, there is a long felt but unresolved need for a method and a system that complete an incomplete call made by a calling party to a called party by executing a call completion action, for example, setting up a reminder, transmitting voice messages, text messages, missed call alerts, notifications of a call attempt, etc., to the called party, etc., independent of a preconfigured call completion service on the called party's network or a called party device, and that provide a sender, that is, the calling party the option to drive or trigger execution of the call completion action.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The method and the system disclosed herein address the above stated need for completing an incomplete call made by a calling party to a called party by executing a call completion action, for example, one that leads to setting up a reminder, or one that leads to transmitting a voice message, a text message, a missed call alert, a notification of a call attempt, other calling party driven messages, etc., to the called party, etc., independent of a preconfigured call completion service on the called party's network or a called party device, and for providing a sender, that is, the calling party the option to drive or trigger execution of the call completion action. As used herein, the term "sender" refers to a user, for example, a calling party who initiates a call to a recipient or a called party and wants to communicate with the recipient. Also, as used herein, the phrase "called party device" refers to a communication device of a called party who is a recipient or an intended recipient of a call made by the calling party. The method and the system disclosed herein therefore allow the calling party to perform an action, for example, communicate with the called party in lieu of the initial incomplete voice call attempt made by the calling party. The method and the system disclosed herein enable a seamless execution of an action by the calling party, for example, an action that leads to a seamless transmission of a message from the calling party to the called party when the call is not completed, where the calling party is prompted automatically to perform an action, for example, transmit a message, when the call is not completed. Furthermore, the method and the system disclosed herein implement a call completion service without any dependence on the underlying network to support call completion for the called party, with the calling party equipped with sufficient information and capability to trigger execution of the action.

The method and the system disclosed herein, for example, enable transmission of a voice message by a calling party to a called party when a network component or a called party device is not configured to offer a call completion option to the calling party to leave a voice message. The method and the system disclosed herein provide a call completion application executable by at least one processor on a calling party device. As used herein, the phrase "calling party device" refers to a communication device of a calling party who originates a call or attempts to place a call to a called party. The calling party device and the called party device are, for example, mobile phones, smart phones, tablet computing devices, network enabled computing devices, etc. The call completion application on the calling party device detects an incomplete call made by the calling party to the called party. As used herein, the phrase "incomplete call" refers to a call made by a calling party to a called party, that is not received or completed by the called party, or not connected to the called party device, for example, because the called party is busy, is in an out of coverage area, is unreachable, etc., or the called party device is switched off, or the call is not answered by the called party, or due to network congestion, etc. In an embodiment, the phrase "incomplete call" also refers to a call of a short duration, referred to as a "short duration call", made by a calling party to a called party, that is considered incomplete as the duration of the call is too short for an intended communication to occur between the calling party and the called party. In an embodiment, the call completion application on the calling party device monitors the incomplete call as the incomplete call progresses from the incomplete call being initiated, the incomplete call being answered or rejected, and the incomplete call being terminated.

On detecting an incomplete call, the call completion application on the calling party device determines one or more of multiple call completion actions to be performed to complete the detected incomplete call. The call completion actions comprise, for example, setting a reminder to call back the called party at a configurable time, recording media data on the calling party device, transmitting the media data to the called party device, transmitting a missed call alert to the called party device, transmitting a notification of the detected incomplete call to the called party device, transmitting a notification on availability of the called party, transmitting the media data to a social networking platform, transmitting an automated message requesting the called party to call back the calling party when available, etc., and any combination thereof. As used herein, the term "media data" refers to a stored form of media, for example, sounds, images, videos, text data, etc., produced and recorded for the purpose of audibly listening to a reproduction of those sounds or for the purpose of viewing a reproduction of the images, videos, text data, etc. The media data comprise, for example, one of text data, audio data, video data, audiovisual data, image data, multimedia data, message data, etc., and any combination thereof. In an embodiment, the call completion application determines the call completion actions based on a duration of the detected incomplete call. In another embodiment, the call completion application determines the call completion actions based on one or more of configurable criteria. The configurable criteria comprise, for example, user configuration of the call completion application on the calling party device, call settings configured on the calling party device, network characteristics, device characteristics, etc.

In another embodiment, the call completion application determines the call completion actions as follows: On detecting an incomplete call, the call completion application on the calling party device generates a request defining the call completion actions for completing the detected incomplete call. The call completion application renders the generated request on a graphical user interface (GUI) of the calling party device and receives a response to the generated request from the calling party via the GUI. That is, the calling party's call completion application determines the intent of the calling party for performing an appropriate action for communicating with the called party based on the received response. The response comprises, for example, a selection of one or more of the call completion actions to be executed for completing the detected incomplete call.

The call completion application on the calling party device triggers execution of one or more call completion actions determined based on the duration of the detected incomplete call, or determined based on the configurable criteria, or determined from the received response of the calling party, based on one or more action execution criteria for completing the detected incomplete call. For example, the calling party's call completion application transmits a message of the calling party to the called party device via the network based on one or more action execution criteria. The action execution criteria comprise, for example, configuration of call completion actions on the calling party device, a presence or an absence of a message box and/or a messaging application for receiving media data on a network account of the called party or on the called party device, a presence or an absence of a data connection from the calling party device to a network, a presence or an absence of a messaging service in a network component of the calling party, a presence or an absence of a messaging service in a network component of the called party, reach of the messaging service to deliver the media data to the network component of the called party or to the called party device, network options provided to the calling party device and the called party device by the network to which the calling party device and the called party device are connected, call completion preferences configured by the call completion application on the calling party device, etc. In an embodiment, the call completion application determines the call completion action to be executed, including a mode of transmission of the media data, for example, a media message from the calling party device to the called party device via a network based on one or more of the action execution criteria.

Disclosed herein is a method for completing a call attempt made by a calling party to a called party. The call attempt is made by the calling party to contact the called party and establish a communications link with the called party. The call completion application on the calling party device monitors call attempts, manages multiple call completion actions selectable by the calling party, and manages completion of the call attempt for the calling party. The call completion application on the calling party device detects a call attempt unanswered by the called party. The call completion application generates a request defining the call completion actions for completing the detected unanswered call attempt. The call completion application renders the generated request on the GUI of the calling party device and receives a response to the generated request from the calling party via the GUI. The call completion application triggers execution of one or more call completion actions determined from the received response of the calling party based on one or more of the action execution criteria for completing the detected unanswered call attempt. In an embodiment, the call completion application on the calling party device determines the call completion action to be executed, including a mode of transmission of media data, for example, a media message from the calling party device to the called party device via the network based on the received response and one or more of the action execution criteria.

In an embodiment, the call completion application on the calling party device detects a call attempt answered by the called party and generates a request defining options for performing the call completion actions associated with the detected answered call attempt for completing the detected answered call attempt. In this embodiment, the answered call attempt is a short duration call interpreted by the call completion application on the calling party device as an incomplete call. The options are, for example, based on the length or duration of the detected answered call attempt. The options comprise, for example, setting a reminder to call back the called party at a configurable time, recording media data on the calling party device, transmitting the media data to the called party device, transmitting a notification of the call attempt to the called party device, transmitting media data to a social networking platform, transmitting an automated message requesting the called party to call back the calling party when available, etc., and any combination thereof. The call completion application renders the generated request on the GUI of the calling party device and receives a response to the generated request from the calling party via the GUI. The response comprises a selection of one or more of the defined options. The call completion application triggers execution of the selected call completion actions determined from the received response of the calling party based on one or more of the action execution criteria for completing the detected answered call attempt. In this embodiment, the call completion application addresses answered calls of duration, for example, less than about 2 seconds, where no intended communication has occurred between the calling party and the called party. The call completion application considers these short duration answered calls as incomplete as the time of 2 seconds is too short to have a conversation and therefore the call completion application provides the option of completing the call to the calling party.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a structure or a method step referenced by a numeral in a drawing carries over to the description of that structure or method step shown by that same numeral in any subsequent drawing herein.

FIG. 3 exemplarily illustrates an algorithm executable by a processor of a calling party device with an Android™ operating system of Google Inc., configured to detect an unanswered call attempt made by a calling party using the calling party device to a called party.

FIG. 4 exemplarily illustrates an algorithm executable by a processor of a calling party device with an iOS® mobile operating system of Apple Inc., configured to detect an unanswered call attempt made by a calling party using the calling party device to a called party.

FIG. 5 exemplarily illustrates a menu displayed on a graphical user interface of a calling party device, showing a list of call completion actions available to a calling party for completing an incomplete call made by the calling party to a called party.

DETAILED DESCRIPTION OF THE INVENTION

Figure 1A:
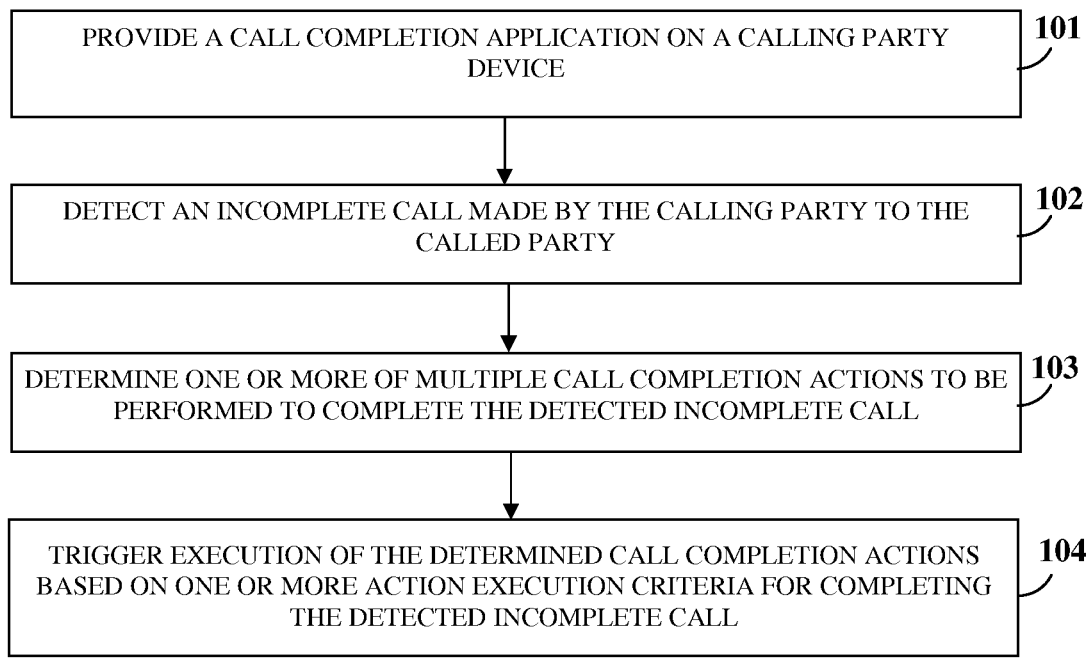
FIG. 1A illustrates a method for completing an incomplete call made by a calling party to a called party.

FIG. 1A illustrates a method for completing an incomplete call made by a calling party to a called party. As used herein, the phrase "calling party" refers to a user who originates a call or attempts to place a call to a called party using a calling party device. Also, as used herein, the phrase "calling party device" refers to a communication device of the calling party. Also, as used herein, the phrase "called party" refers to a user who is a recipient or an intended recipient of a call made by the calling party. The method disclosed herein enables execution of an action, for example, setting up a reminder or transmission of a message by a calling party to a called party, etc., when a network component associated with the called party or a called party device is not configured for offering the calling party the option to send a message to the called party. As used herein, the phrase "called party device" refers to a communication device of the called party. Examples of the calling party device and the called party device are a mobile phone, a smart phone, a tablet computing device, a portable computing device, a personal digital assistant, a touch centric device, a network enabled computing device, etc. The calling party device and the called party device may also be hybrid devices that combine the functionality of multiple devices. Examples of a hybrid device comprise a cellular telephone that includes a media player functionality, a gaming device that includes a wireless communications capability, a cellular telephone that includes game and electronic mail (email) functions, a portable device that receives email, supports mobile telephone calls, has music player functionality, and supports web browsing, etc.

The method disclosed herein provides 101 a call completion application executable by at least one processor on a calling party device. The method disclosed herein is implemented using a computer system as disclosed in the detailed description of FIG. 6. The call completion application is a software application that can be downloaded and implemented on the calling party device. A sender, that is, the calling party initiates a call to a recipient, that is, the called party, when the sender wants to communicate with the recipient. A first network component receives a call attempt from the calling party to contact the called party. The call attempt is made by the calling party to contact the called party and establish a communications link between the calling party and the called party. The first network component routes the call attempt to a second network component for establishing a communications link between the calling party and the called party. As used herein, the terms "first network component" and "second network component" refer, for example, to a mobile switching center (MSC), a base station subsystem (BSS), a radio access network (RAN), a telephone exchange, a telephone switch, etc., serving the calling party and the called party respectively. The first network component is, for example, an originating switch or an originating mobile switching center (MSC) associated with the calling party. The second network component is, for example, a terminating switch or a terminating mobile switching center (MSC) associated with the called party. The second network component is either the same as the first network component or one of multiple network components excluding the first network component.

The call completion application on the calling party device detects 102 an incomplete call made by the calling party to the called party. In an embodiment, the incomplete call is a call made by a calling party to a called party, that is not received or completed by the called party, or not connected to the called party device due to the occurrence of one or more of multiple events comprising, for example, the called party being busy, the called party device being in an out of coverage area, the called party device being unreachable, the called party device being switched off, network congestion, the call not being answered by the called party, etc. In another embodiment, the incomplete call is a call of a short duration, also referred to as a "short duration call", made by a calling party to a called party, that is considered incomplete as the duration of the call is too short for an intended communication to occur between the calling party and the called party. In an embodiment, the call completion application on the calling party device monitors the incomplete call as the incomplete call progresses from the incomplete call being initiated, the incomplete call being answered or rejected, and the incomplete call being terminated. The call completion application checks the status of the call that terminates as well as the duration of the call to determine if the call was incomplete or not. Consider an example where a calling party A calls a called party B. The called party device of called party B is not reachable and does not offer a message service. Consider an example where the calling party A uses a smart phone as the calling party device. The call completion application on the smart phone of the calling party A monitors a disconnection of the call attempted by the calling party A and determines that the call attempt to called party B was unanswered. The call completion application monitors all disconnects by requesting an operating system of the calling party device to inform the call completion application whenever a call ends. The call completion application also considers short duration answered calls, for example, of a duration of less than about 2 seconds, where no intended communication has occurred between the calling party and the called party, as incomplete.

On detecting the incomplete call, the call completion application on the calling party device determines 103 one or more of multiple call completion actions to be performed to complete the detected incomplete call. The call completion actions comprise, for example, setting a reminder to call back the called party at a configurable time, recording media data on the calling party device, transmitting the media data to the called party device, transmitting a missed call alert to the called party device, transmitting a notification of the detected incomplete call to the called party device, transmitting a notification on availability of the called party, transmitting the media data to a social networking platform, transmitting an automated message requesting the called party to call back the calling party when available, etc., and any combination thereof. As used herein, the term "media data" refers to a stored form of media, for example, sounds, images, videos, text data, etc., produced and recorded for the purpose of audibly listening to a reproduction of those sounds or for the purpose of viewing a reproduction of the images, videos, text data, etc. The media data comprise, for example, one of text data, audio data, video data, audiovisual data, image data, multimedia data, message data, etc., and any combination thereof. The media data can be stored, for example, as a media clip, a media message, etc., or in any digital format. As used herein, the term "media message" refers to a message that can be recorded on the calling party device. The media message is, for example, a text message, or an audio message, or a video message, or an audiovisual message, or a picture message, or a multimedia message, etc., or any combination thereof.

In an embodiment, the call completion application on the calling party device determines the call completion actions based on a duration of the detected incomplete call. For example, for short duration calls, the call completion actions determined by the call completion application comprise, for example, setting a reminder to call the called party again, sending a text message to the called party, sending an automated message to the called party requesting the called party to call back the calling party when he/she is free, etc. In an embodiment, the call completion application determines the call completion actions based on one or more configurable criteria. The configurable criteria comprise, for example, user configuration of the call completion application on the calling party device, call settings configured on the calling party device, network characteristics, device characteristics, etc. In this embodiment, the calling party does not need to intervene or select a call completion action on a per call basis. For example, a calling party can configure sending a missed call alert to a called party device, each time a call to a specific number of the called party results in being unanswered due to the called party device being switched off. The call completion application automatically sends the missed call alert to the called party device, on detection of the incomplete call.

In another embodiment, the call completion application on the calling party device generates a request defining the call completion actions for completing the detected incomplete call. The call completion application defines the call completion actions to be provided to the calling party based on one or more of the configurable criteria comprising, for example, call settings configured on the calling party device by the calling party, network characteristics, device characteristics, etc. The call completion application, for example, generates a query message for the calling party, defining the call completion actions for completing the detected incomplete call using a message. The call completion application renders the generated request on a graphical user interface (GUI) of the calling party device. The GUI is, for example, a mobile based downloadable application interface. The call completion application receives a response to the generated request from the calling party via the GUI. The response comprises, for example, a selection of one or more of the call completion actions to be executed for completing the detected incomplete call. In an example, on detecting that there was an incomplete call to called party B, the call completion application on the calling party device of calling party A generates a pop up message, "Do you want to send called party B a message?", on the GUI of the calling party device. In another example, the call completion application on the calling party device of calling party A generates a pop up message with a menu of call completion actions, for example, "Do you want to send called party B (a) a voice message, (b) a text message, (c) a video message, (d) a missed call alert, (e) a pre-recorded message, or (f) set a reminder to call called party B?"

The call completion application on the calling party device triggers 104 execution of the call completion actions determined based on the duration of the detected incomplete call, or determined based on the configurable criteria, or determined from the received response of the calling party, based on one or more action execution criteria for completing the detected incomplete call. For example, the call completion application on the calling party device triggers preparation of recording and transmission of a message to the called party device, on receiving a confirmation response to the generated request from the calling party via the GUI. In another example, the call completion application, on detecting an incomplete call, generates a request defining an option to set a reminder for the calling party to call the called party again. The call completion application creates the reminder, for example, in the form of a calendar entry for the calling party to remind the calling party to call back the called party at a particular time. The action execution criteria are a set of factors that determine an appropriate method for executing a call completion action, for example, transmitting a message to the called party device. The action execution criteria comprise, for example, configuration of call completion actions on the calling party device, for example, the calling party's mobile phone, a presence or an absence of a message box and/or a messaging application for receiving media data such as a message on a network account of the called party and/or on the called party device, a presence or an absence of a data connection from the calling party device to a data network, a presence or an absence of a messaging service in the network component of the calling party, a presence or an absence of a messaging service in the network component of the called party, reach of the messaging service to deliver the media data to the network of the called party or to the called party device, network options provided to the calling party device and the called party device by the data network to which the calling party device and the called party device are connected, call completion preferences configured by the call completion application on the calling party device, etc.

In an embodiment, the call completion application on the calling party device determines a mode of transmission of the media data, for example, in the form of a voice message, a text message, a missed call alert, a notification of a call attempt, etc., from the calling party device to the called party device via a network based on the received response from the calling party and/or the action execution criteria. That is, the calling party's call completion application determines the appropriate mode and method of transmitting the message to the called party device of called party B. For example, the calling party's call completion application determines whether to transmit the message directly to the called party device or to transmit the message through a voice short message service (SMS) server. As used herein, the term "voice SMS" refers to a multimodal SMS service that allows exchange of text SMS messages integrated with voice content. The calling party's call completion application transmits the message recorded or selected by the calling party to the called party device via a network based on the determined mode of transmission of the message. In an example, the calling party's call completion application transmits a message recorded by the calling party to the called party device using a multimedia messaging service (MMS), an SMS, etc.

Consider an example where the call completion application on the calling party device is not able to distinguish between a scenario when the calling party was presented with an option of sending a message but decided not to send the message, and a scenario when the calling party did not have an option to complete the incomplete call. The calling party may be unable to complete the incomplete call, for example, due to an absence of a messaging configuration or a call completion service configuration on the called party device. In an embodiment, the method disclosed herein provisions a software application in the network in a cloud computing environment. As used herein, the phrase "cloud computing environment" refers to a processing environment comprising configurable computing physical and logical resources, for example, networks, servers, storage, applications, services, etc., and data distributed over a network, for example, the internet. The cloud computing environment provides on-demand network access to a shared pool of the configurable computing physical and logical resources. The call completion application on the calling party device communicates with the provisioned software application at the end of an incomplete call, that is, subsequent to an unanswered call attempt. The software application in the network has access to multiple call completion servers, thereby allowing the software application in the network to access the messaging and call completion configuration, the network services subscribed by the called party, etc. The software application in the network retrieves the status of the call, that is, whether the calling party can send a message to the called party and transmits a notification message to the call completion application on the calling party device. The calling party's call completion application thereby determines an absence of a call completion service on the called party device and/or a failure of a configuration of the call completion service by the network component of the called party, on detecting the incomplete call. The call completion application on the calling party device accordingly generates call completion options for transmitting a message, for example, an option to "Send a voice message" or not to the called party. For example, if the call completion application on the calling party device determines that the calling party was offered an option to record and send a voice message to the called party as part of an unanswered call attempt, but decided against sending the voice message, then the call completion application may decide to offer the option to "Send a Text SMS", and not offer an option to "Send a Voice SMS".

In an embodiment, the call completion application on the calling party device triggers recording of the message on the calling party device. In an example, the call completion application on the calling party device may record a message locally on the calling party device, for example, a calling party's mobile phone, and transmit the recorded message to the called party using an over-the-top (OTT) data connection. As used herein, an "over-the-top" data transmission refers to transmission of data, for example, a voice message in a digitized format, independent of the control of the configured network components, from the calling party to the called party. In another example, the call completion application on the calling party device delivers the voice message as an MMS message to the called party device. If the message is only text, the call completion application on the calling party device delivers the message as an SMS message to the called party device. In another example, the call completion application on the calling party device initiates the composition of a voice SMS call, for example, by dialing "*" followed by a phone number of the called party. In another example, the call completion application on the calling party device may record a message locally on the calling party device and transmit the recorded message to a voice SMS server in the network using the over-the-top (OTT) data connection. The voice SMS server in the network then delivers the message to the called party as a voice SMS. Consider an example where a calling party A has clicked on an option provided on the GUI of the calling party device affirming that calling party A wants to transmit a voice message to a called party B. The call completion application on the calling party device of calling party A determines the mode of transmission of a voice message as a local recording and OTT message delivery via the data network. The call completion application on the calling party device of calling party A then displays a notification message, for example, "Start speaking", thereby allowing the calling party to drive or trigger the voice message service. Therefore, the call completion application on the calling party device determines the method by which a message needs to be transmitted to the called party device and transmits the message to the called party device accordingly.

In an embodiment, the called party device is provided with a local message store for storing incoming messages, for example, as part of a voice messaging application installed on the called party device. In another embodiment, the messages for the called party are stored in a cloud based server to be contacted by the called party for retrieving the messages. In another embodiment, a voice SMS server of calling party A or called party B notifies called party B, for example, by an SMS text message indicating that the calling party A has transmitted a voice message, along with instructions for opening or accessing the voice message. In another embodiment, the voice SMS server of calling party A or called party B initiates delivery of messages to called party B, for example, by an outbound delivery (OBD) mechanism. As used herein, the term "outbound delivery mechanism" refers to a method by which a messaging service, for example, a voice messaging service delivers messages to a called party device by initiating a voice call from the call completion application on the calling party device to the called party, and playing the messages, for example, voice messages during the voice call after the called party has answered the call. The called party does not have to dial a number to initiate a call to access the messages.

Figure 1B:
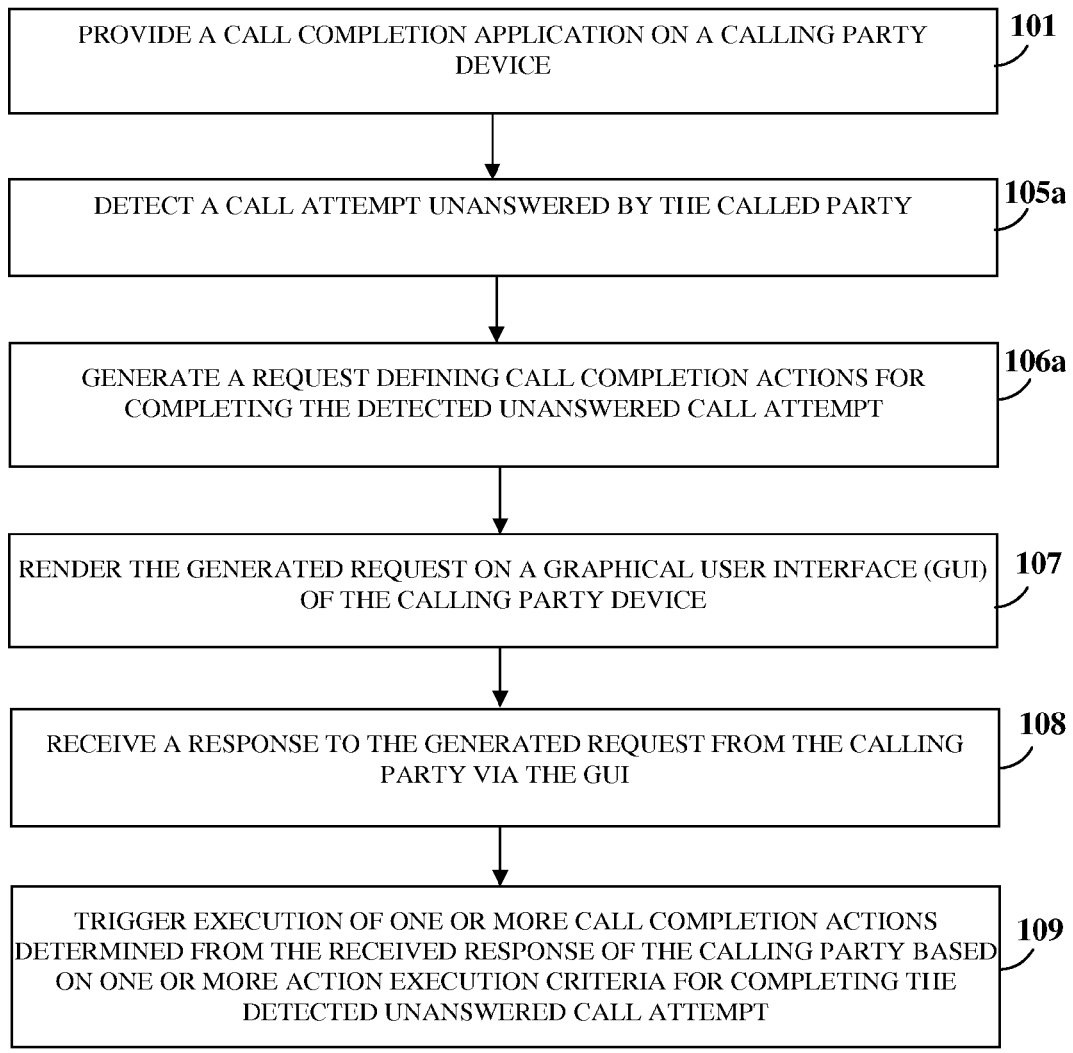
FIG. 1B illustrates an embodiment of the method for completing an incomplete call made by a calling party to a called party.

FIG. 1B illustrates an embodiment of the method for completing an incomplete call made by a calling party to a called party. In this embodiment, the incomplete call is an unanswered call. The method disclosed herein is implemented using a computer system as disclosed in the detailed description of FIG. 6. The call completion application is provided 101 on a calling party device as disclosed in the detailed description of FIG. 1A. The call completion application monitors call attempts, manages multiple call completion actions selectable by the calling party, and manages the completion of the call attempt for the calling party. The call completion application on the calling party device detects 105a a call attempt unanswered by the called party. As used herein, the term "unanswered call attempt" refers to a call attempt made by a calling party to a called party, that is not received or answered by the called party, or not connected to a called party device due to an occurrence of, for example, a busy signal, an out of coverage signal, an unreachable signal, a switched off signal, network congestion, an unanswered signal from the called party, etc. The call completion application detects the unanswered call attempt, for example, when the called party device is switched off or when the called party is busy or on another call, or when the called party is not answering. The call completion application generates 106a a request defining the call completion actions for completing the detected unanswered call attempt. The call completion application renders 107 the generated request on the graphical user interface (GUI) of the calling party device. The call completion application receives 108 a response to the generated request from the calling party via the GUI. The call completion application triggers 109 execution of one or more call completion actions determined from the received response of the calling party based on one or more of the action execution criteria disclosed in the detailed description of FIG. 1A, for completing the detected unanswered call attempt. In an embodiment, the call completion application determines the call completion action to be executed, including a mode of transmission of a media message from the calling party device to the called party device via a network based on the received response and one or more of the action execution criteria.

Figure 1C:
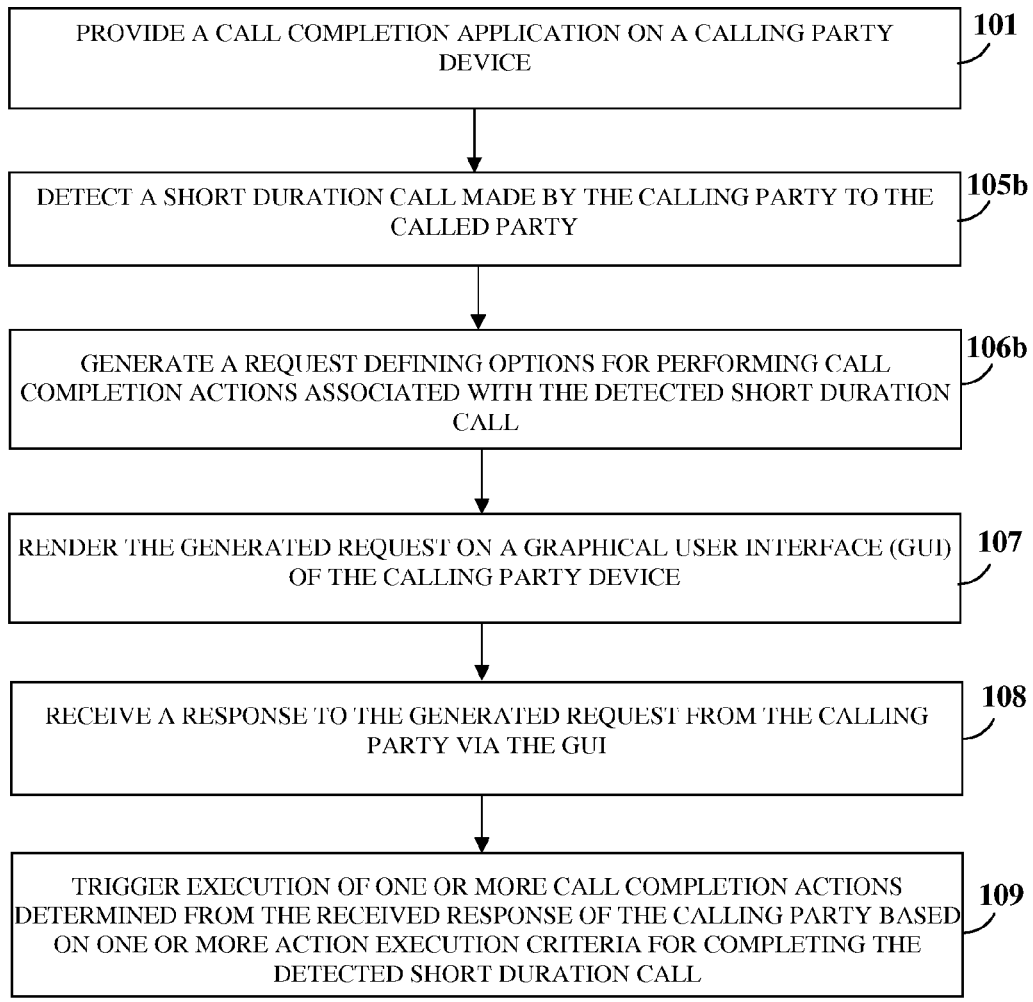
FIG. 1C illustrates another embodiment of the method for completing an incomplete call made by a calling party to a called party.

FIG. 1C illustrates another embodiment of the method for completing an incomplete call made by a calling party to a called party. In this embodiment, the incomplete call is a short duration call that does not enable an intended communication to occur between the calling party and the called party. The method disclosed herein is implemented using a computer system as disclosed in the detailed description of FIG. 6. The call completion application is provided 101 on the calling party device as disclosed in the detailed description of FIG. 1A. The call completion application on the calling party device detects 105b a call attempt answered by the called party, that is, a short duration call made by the calling party to the called party. The call completion actions for completing the short duration call is similar to those for an unanswered call with some variations, for example, in the message conveyed to the called party or the reason for the incomplete call displayed on the calling party device. The call completion application generates 106b a request defining options for performing the call completion actions associated with the detected short duration call for completing the detected short duration call. The options are, for example, based on the length or duration of the detected short duration call. The options comprise, for example, setting a reminder to call back the called party at a configurable time, recording media data on the calling party device, transmitting the media data to the called party device, transmitting a notification of the call attempt to the called party device, transmitting media data to a social networking platform, transmitting an automated message requesting the called party to call back the calling party when available, etc., and any combination thereof. The call completion application renders 107 the generated request on the graphical user interface (GUI) of the calling party device. For example, for short duration calls, the call completion application displays a message such as "Looks like the called party could not talk to you at this time. Do you want to send a message to the called party?", or "That was a short call. Do you want to send a pre-recorded message to the called party?", or "Was there a problem with this call? Do you want to send (a) a voice message, (b) a text message, (c) a video message, (d) a pre-recorded message, or (e) set a reminder to call the called party?", etc., on the calling party device. The call completion application receives 108 a response to the generated request from the calling party via the GUI. The response comprises a selection of one or more of the defined options. The call completion application triggers 109 execution of one or more of the call completion actions determined from the received response of the calling party based on one or more of the action execution criteria disclosed in the detailed description of FIG. 1A, for completing the detected short duration call. For example, the call completion application transmits a message to the called party device via the network, based on the determined mode of transmission of the message and one or more of the action execution criteria. In this embodiment, the call completion application addresses answered calls of duration, for example, of less than about 2 seconds, where no intended communication has occurred between the calling party and the called party. The call completion application considers these short duration answered calls as incomplete.

Figure 2:
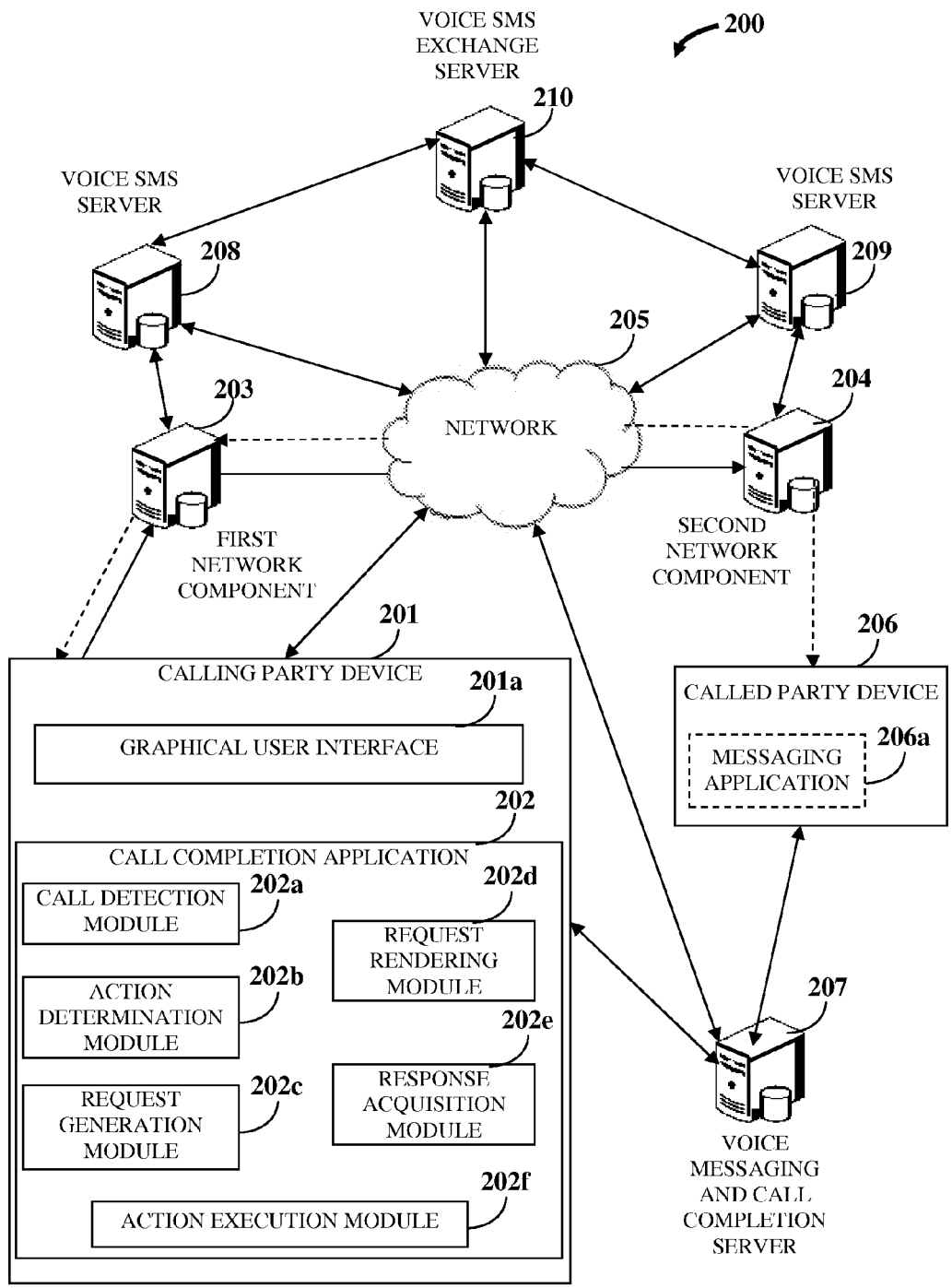
FIG. 2 exemplarily illustrates a system for completing an incomplete call made by a calling party to a called party.

FIG. 2 exemplarily illustrates a system 200 for completing an incomplete call made by a calling party to a called party. The system 200 disclosed herein enables transmission of a message, for example, a voice message, a text message, a missed call alert, a notification of a call attempt, etc., from a calling party device 201 to a called party device 206, when a second network component 204 associated with the called party or the called party device 206 is not configured for offering the calling party an option to complete the incomplete call. The calling party device 201 comprises a non-transitory computer readable storage medium configured to store the call completion application 202 and at least one processor communicatively coupled to the non-transitory computer readable storage medium. As used herein, the term "non-transitory computer readable storage medium" refers to all computer readable media, for example, non-volatile media such as optical discs or magnetic disks, volatile media such as a register memory, a processor cache, etc., and transmission media such as wires that constitute a system bus coupled to the processor, except for a transitory, propagating signal. The processor is configured to execute the call completion application 202 on the calling party device 201.

The calling party device 201 is associated with a first network component 203 and the called party device 206 is associated with a second network component 204. The first network component 203 is, for example, an originating mobile switching center (MSC). The second network component 204 is, for example, a terminating MSC. The calling party device 201, the called party device 206, and their associated network components 203 and 204 communicate with a network 205. The network 205 is a telephone network and/or a data network that connects exchanges, switches, etc. The network 205 is, for example, a wired telephony network, a wireless network, a voice call network, a signaling system number 7 (SS7) network, an internet protocol data network, another data network, etc. The calling party makes a call attempt to contact the called party and establish a communications link between the calling party and the called party. When the calling party attempts to make a call using the calling party device 201, for example, a mobile phone, a smart phone, a personal digital assistant (PDA), a tablet computing device, etc., to contact the called party, the calling party device 201 of the calling party connects to the network 205 via the first network component 203.

The calling party device 201 of the calling party connects to the first network component 203. The called party device 206, for example, a mobile phone, a smart phone, a personal digital assistant (PDA), a tablet communication device, etc., of the called party connects to the second network component 204. The first network component 203 serves the calling party and receives the call attempt from the calling party. The first network component 203 routes a call made by the calling party to an appropriate destination based on a dialed number via the network 205. The first network component 203 routes the received call attempt to the second network component 204 via the network 205 for establishing the communications link between the calling party and the called party. The second network component 204 receives the call attempt from the first network component 203 via the network 205 and in turn routes the received call attempt to the called party device 206. If the second network component 204 detects that the call attempt is incomplete, for example, unanswered by the called party device 206, the second network component 204 redirects the unanswered call attempt to the first network component 203 via the network 205. The first network component 203 then redirects the unanswered call attempt to the call completion application 202 on the calling party device 201.

A voice messaging and call completion server 207 is disposed between the calling party device 201 and the called party device 206 via the network 205. The voice messaging and call completion server 207 facilitates transmission of messages between the calling party device 201 and the called party device 206 during the event of an unanswered call attempt or a short duration call. The voice messaging and call completion server 207 stores the messages in the form of a queue. The storage of the message depends on the method used to deliver the message. In an embodiment, the voice messaging and call completion server 207 communicates with voice short message service (SMS) servers 208 and 209 and a voice SMS exchange server 210 via the network 205 for delivering messages using a voice short message service (SMS). For example, if the message is delivered using a voice SMS, a voice SMS server 208 associated with the calling party stores the message in the first network component 203 of the calling party's carrier. If the carrier of the calling party is the same as the carrier of the called party, then there is a single voice SMS server 208. In another example, where the carrier of the calling party is different from the carrier of the called party, and if the carriers of the calling party and the called party are using a voice SMS exchange service via the voice SMS exchange server 210, a voice SMS server 209 associated with the called party stores the message in the second network component 204 of the called party's carrier. The called party can call a short code or a number to listen to the message.

In another example, an outbound delivery mechanism of the voice SMS server 208 delivers the message to the called party. The called party accesses the messages sent by the calling party from the voice SMS server 208 if there is no voice SMS exchange service, or from the voice SMS server 209 in case there is a voice SMS exchange service. In another example, if the called party has a smart phone with a smart phone client installed in the called party's smart phone, then, in an embodiment, the call completion application 202 can directly deliver the message to the called party using the voice messaging and call completion server 207 but bypassing the voice SMS server 208. In another embodiment, the message is first routed to a cloud based voice messaging server and the message is stored on the voice messaging server in the cloud computing environment. A copy of the message may then be downloaded by the client on the called party device 206 using a messaging application 206a. The messaging application 206a is compatible with the call completion application 202 on the calling party device 201 and the voice messaging and call completion server 207. If the calling party sends a text message or a missed call alert, the SMS message or the text message sent over the network 205, is sent to the called party device 206. The method and the system 200 disclosed herein therefore notify the called party about the message sent by the calling party, for example, via a text SMS message or a text message over a data network.

The call completion application 202 on the calling party device 201 comprises a call detection module 202a, an action determination module 202b, and an action execution module 202f. The call detection module 202a detects an incomplete call, for example, an unanswered call, a short duration call, etc., made by the calling party to the called party. The call detection module 202a further monitors the incomplete call on the calling party device 201 as the incomplete call progresses from the incomplete call being initiated, the incomplete call being answered or rejected, and the incomplete call being terminated. Furthermore, in an embodiment, the call detection module 202a of the call completion application 202 on the calling party device 201, in communication with a software application in the network 205, determines an absence of a message service on the called party device 206 and/or a failure of a configuration of the message service by the second network component 204 associated with the called party, on detecting an incomplete call.

The action determination module 202b determines one or more of multiple call completion actions to be performed to complete the detected incomplete call. In an embodiment, the action determination module 202b determines one or more of multiple call completion actions based on a duration of the detected incomplete call. In another embodiment, the action determination module 202b determines one or more of multiple call completion actions based on one or more of configurable criteria comprising, for example, user configuration of the call completion application 202 on the calling party device 201, call settings configured on the calling party device 201, network characteristics, device characteristics, etc. The action execution module 202f triggers execution of the determined call completion actions based on one or more of the action execution criteria for completing the detected incomplete call. The action execution module 202f further determines a mode of transmission of media data from the calling party device 201 to the called party device 206 via the network 205 based on one or more of the action execution criteria.

The call completion application 202 further comprises a request generation module 202c, a request rendering module 202d, and a response acquisition module 202e. The request generation module 202c generates a request defining call completion actions for completing the detected incomplete call. The request rendering module 202d renders the generated request on a graphical user interface (GUI) 201a of the calling party device 201. The response acquisition module 202e receives a response to the generated request from the calling party via the GUI 201a. The action execution module 202f triggers the execution of the call completion actions determined from the received response of the calling party based on one or more of the action execution criteria for completing the detected incomplete call. If the call completion action determined from the received response is the transmission of a message, the action execution module 202f triggers transmission of the message recorded by the calling party to the called party device 206 via the network 205 based on the determined mode of transmission of the message and one or more of the action execution criteria as disclosed in the detailed description of FIG. 1A.

In an embodiment, the call detection module 202a detects a call attempt unanswered by the called party. In this embodiment, the request generation module 202c generates a request defining call completion actions for completing the detected unanswered call attempt. In another embodiment, the call detection module 202a detects a call attempt answered by the called party, that is, a short duration call. In this embodiment, the request generation module 202c generates a request defining options for performing call completion actions associated with the detected short duration call for completing the detected short duration call. The request rendering module 202d renders the generated request on the GUI 201a of the calling party device 201. The response acquisition module 202e receives a response to the generated request from the calling party via the GUI 201a. The action execution module 202f triggers execution of one or more of the call completion actions determined from the received response of the calling party based on one or more of the action execution criteria for completing the detected unanswered call attempt or the detected short duration call.

In an embodiment, the voice messaging and call completion server 207 manages the transmission of the message recorded by the calling party to the called party device 206 via the network 205. The voice messaging and call completion server 207 stores all the voice messages, missed call alerts, other messages, etc., exchanged between the calling party device 201 and the called party device 206 in one or more databases. The voice messaging and call completion server 207 accepts messages sent by the call completion application 202 on the calling party device 201 and delivers the messages to the called party device 206. The mechanism used for delivery of the messages may vary based on the type of message, for example, a voice message, a text message, a missed call alert, etc., as well as the capability and the connectivity of the called party device 206, for example, based on a presence or an absence of a message box for receiving a message from the calling party, a presence or an absence of data connectivity on the called party device 206, etc.

FIG. 3 exemplarily illustrates an algorithm executable by a processor of a calling party device 201 with an Android™ operating system of Google Inc., configured to detect an unanswered call attempt made by a calling party using the calling party device 201 to a called party. The call completion application 202 provided on the calling party device 201, exemplarily illustrated in FIG. 2, detects the unanswered call attempt. The call completion application 202 monitors the call attempt as the call attempt progresses from a call being initiated, a call being answered or rejected, and a call ending. The call completion application 202 checks a status of the call that ends and a duration of the call to determine whether the call is incomplete. The call completion application 202 detects a change of state of the call between the following: "idle", "off_hook", and "ringing" using a function "onCallStateChanged( )" to request the Android™ operating system to issue a callback to the call completion application 202. The call completion application 202 may ignore the change of call states, for example, "'idle" to "ringing" to "idle"", "'idle" to "ringing" to "off_hook" to "idle"", and "'idle" to "ringing" to "off_hook" to "ringing" to "off_hook" to "idle"", related to incoming calls that may be missed calls or answered calls. A change of state of the call from "idle" to "ringing" to "idle" represents an incoming call that was not answered. A change of state of the call from "idle" to "ringing" to "off_hook" to "idle" represents an incoming call that was answered and then ended. A change of state of the call from "idle" to "ringing" to "off_hook" to "ringing" to "off_hook" to "idle" represents an incoming call that was answered, followed by another incoming call which may or may not have been answered, and then ended. The change of call states, for example, "'idle" to "off_hook" to "idle"" represent an outgoing call attempt that may or may not have been answered. A change of state of the call from "idle" to "off_hook" to "idle" represents an outgoing call attempt. The call completion application 202 determines the difference between an answered call attempt and an unanswered call attempt by fetching the last entry for outgoing calls from a call log using a function "Calllog.getLastOutgoingCall". The call completion application 202 checks the value of the "duration" field in the call log. A value of 0 in the "duration" field indicates that the call was not answered. A value of 2 or more in the "duration" field indicates that the call was answered. A value greater than 0 but less than 2 in the "duration" field represents a short duration call that is also considered as an incomplete call by the call completion application 202.

FIG. 4 exemplarily illustrates an algorithm executable by a processor of a calling party device 201 with an iOS® mobile operating system of Apple Inc., configured to detect an unanswered call attempt made by a calling party using the calling party device 201 to a called party. The call completion application 202 provided on the calling party device 201 as exemplarily illustrated in FIG. 2, detects the unanswered call attempt. The call completion application 202 monitors the call attempt as the call attempt progresses from a call being initiated, the call being answered or rejected, and the call ending. The call completion application 202 checks the status of the calls that end and their duration to determine if the calls are incomplete or not. The call completion application 202 is registered with iOS® using a function "callEventHandler( )" to be notified about any change in the call state. The call completion application 202 detects a change of state of the call from the following: "CTCallStateDisconnected", "CTCallStateDialing", "CTCallStateConnected", and "CTCallStateIncoming". The call completion application 202 may ignore the change of call states, for example, "'CTCallStateDisconnected" to "CTCallStateIncoming" to "CTCallStateDisconnected"", "'CTCallStateDisconnected" to "CTCallStateIncoming" to "CTCallStateConnected" to "CTCallStateDisconnected"", and "CTCallStateDisconnected" to "CTCallStateIncoming" to "CTCallStateConnected" to "CTCallStateIncoming" to "CTCallStateConnected" to "CTCallStateDisconnected". A change of state of the call from "CTCallStateDisconnected" to "CTCallStateIncoming" to "CTCallStateDisconnected" represents an incoming call that was not answered. A change of state of the call from "CTCallStateDisconnected" to "CTCallStateIncoming" to "CTCallStateConnected" to "CTCallStateDisconnected" represents an incoming call that was answered and then ended. A change of state of the call from "CTCallStateDisconnected" to "CTCallStateIncoming" to "CTCallStateConnected" to "CTCallStateIncoming" to "CTCallStateConnected" to "CTCallStateDisconnected" represents an incoming call that was answered, followed by another incoming call which may or may not have been answered, and then ended. A change of state of the call from "CTCallStateDisconnected" to "CTCallStateDialing" to "CTCallStateConnected" to "CTCallStateDisconnected" represents an outgoing call that was answered. A change of state of the call from "CTCallStateDisconnected" to "CTCallStateDialing" to "CTCallStateDisconnected" represents an outgoing call that was not answered.

For purposes of illustration, the detailed description of FIGS. 3-4 refers to example algorithms for detecting an unanswered call attempt on a calling party device 201 with an Android™ operating system of Google Inc., and on a calling party device 201 with an iOS® mobile operating system of Apple Inc.; however the scope of the method and the system 200 disclosed herein is not limited to detection of an unanswered call attempt on a calling party device 201 with the Android® operating system or the iOS® mobile operating system, as disclosed in the detailed description of FIGS. 3-4, but may be extended to include other algorithms for detecting an unanswered call attempt or a short duration call on different communication devices with different operating systems. Furthermore, the scope of the method and the system 200 disclosed herein is extended to include different methods for detecting incomplete calls based on the calling party's inputs and preferences.

FIG. 5 exemplarily illustrates a menu displayed on a graphical user interface (GUI) 201a of a calling party device 201 exemplarily illustrated in FIG. 2, showing a list of call completion actions available to a calling party for completing an incomplete call made by the calling party to a called party. The list of call completion actions comprises, for example, "Send a Text Message", "Send a Voice Message", "Send a Video Message", "Send a Pre-recorded Message", "Send a Missed Call Alert", "Be Alerted when the Called Party is Available", "Add to Reminder", "Add to Calendar", "Send a Direct Message on Twitter®", "Post to the Called Party's Facebook® Page", "Send a Private Chat Message to the Called Party's Facebook® Identity", etc. The call completion application 202, exemplarily illustrated in FIG. 2, generates a pop up message with a menu of the call completion actions on the GUI 201a of the calling party device 201. The call completion application 202 selectively displays one or more of the call completion actions based on factors such as the reason for the call attempt not being completed such as no reply, busy, switched off, etc., the reason the call attempt was not answered, the call completion actions' settings selected by the calling party, and based on the network and device characteristics of the calling party device 201. Moreover, the call completion application 202 displays the "Post to the Called Party's Facebook® Page" option and/or the "Send a Private Chat Message to the Called Party's Facebook® Identity" option on the GUI 201a of the calling party device 201 only if both the calling party and the called party have an identity on Facebook® of Facebook, Inc., and the calling party's Facebook® identity has permission to post to the called party's Facebook® page" and/or to send a private chat message to the called party's Facebook® identity. Similarly, the call completion application 202 displays the "Send a Direct Message to Twitter®" option on the GUI 201a of the calling party device 201 only if both the calling party and the called party have an identity on Twitter® of Twitter, Inc., and the calling party's Twitter® identity has the permission to send a direct message to the called party's Twitter® identity. If the called party's carrier has the provision for alerting the calling party when the called party is available, then the call completion application 202 displays the "Be Alerted when the Called Party is Available" option on the GUI 201a of the calling party device 201. If the call was incomplete because the called party chose not to answer the call or rejected the call, then the call completion application 202 does not display the "Be alerted when the Called Party is available" option on the GUI 201a of the calling party device 201.

Figure 6:
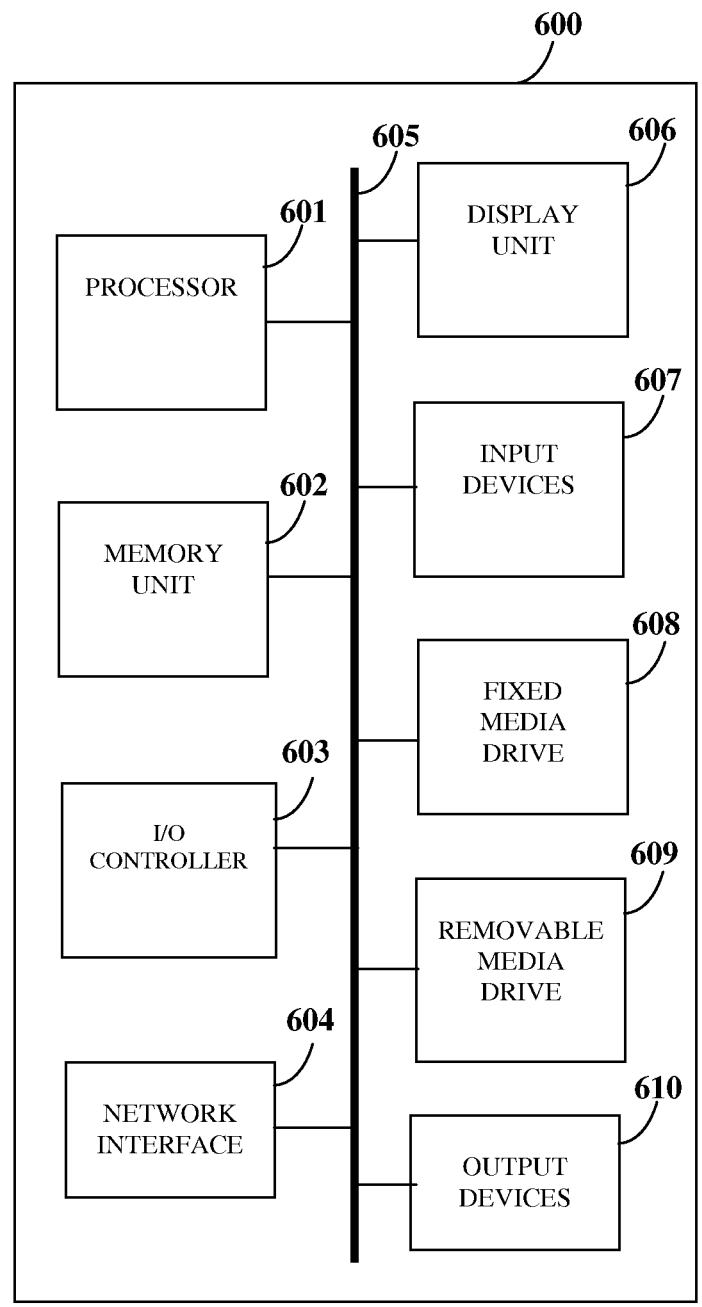
FIG. 6 exemplarily illustrates the architecture of a computer system employed by a call completion application for completing an incomplete call made by a calling party to a called party.

FIG. 6 exemplarily illustrates the architecture of a computer system 600 employed by the call completion application 202 for completing an incomplete call made by a calling party to a called party. The calling party device 201 exemplarily illustrated in FIG. 2 employs the architecture of the computer system 600 exemplarily illustrated in FIG. 6. The computer system 600 is programmable using a high level computer programming language. The computer system 600 may be implemented using programmed and purposeful hardware. The call completion application 202 on the calling party device 201 communicates with the called party device 206 via the network 205, for example, a short range network or a long range network.

The computer system 600 comprises, for example, a processor 601, a non-transitory computer readable storage medium such as a memory unit 602 for storing programs and data, an input/output (I/O) controller 603, a network interface 604, a data bus 605, a display unit 606, input devices 607, a fixed media drive 608, output devices 610, etc. The computer system 600 may optionally comprise a removable media drive 609 for receiving removable media. The processor 601 refers to any one or more microprocessors, central processing unit (CPU) devices, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 601 may also be implemented as a processor set comprising, for example, a general purpose microprocessor and a math or graphics co-processor. The processor 601 is selected, for example, from the Intel® processors such as the Itanium® microprocessor or the Pentium® processors, Advanced Micro Devices (AMD®) processors such as the Athlon® processor, UltraSPARC® processors, microSPARC® processors, Hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The calling party device 201 is not limited to a computer system 600 employing a processor 601. The computer system 600 may also employ a controller or a microcontroller. The processor 601 executes the modules, for example, 202a, 202b, 202c, 202d, 202e, 202f, etc., of the call completion application 202.

The memory unit 602 is used for storing programs, applications, and data. For example, the call detection module 202a, the action determination module 202b, the request generation module 202c, the request rendering module 202d, the response acquisition module 202e, the action execution module 202f, etc., of the call completion application 202 are stored in the memory unit 602 of the computer system 600. The memory unit 602 is, for example, a random access memory (RAM) or another type of dynamic storage device that stores information and instructions for execution by the processor 601. The memory unit 602 also stores temporary variables and other intermediate information used during execution of the instructions by the processor 601. The computer system 600 further comprises a read only memory (ROM) or another type of static storage device that stores static information and instructions for the processor 601. The I/O controller 603 controls input actions and output actions performed by the call completion application 202.

The network interface 604 enables connection of the computer system 600 to the network 205. For example, the calling party device 201 connects to the network 205 via the network interface 604. In an embodiment, the network interface 604 is provided as an interface card also referred to as a line card. The network interface 604 comprises, for example, one or more of an infrared (IR) interface, an interface implementing Wi-Fi® of the Wireless Ethernet Compatibility Alliance, Inc., a universal serial bus (USB) interface, a FireWire® interface of Apple, Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, and Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The data bus 605 permits communications between the modules, for example, 202a, 202b, 202c, 202d, 202e, 202f, etc., of the call completion application 202.

The display unit 606, via the graphical user interface (GUI) 201a, displays information, display interfaces, user interface elements such as text fields, checkboxes, text boxes, windows, selectable icons, etc., for rendering a generated request on the GUI 201a of the calling party device 201, for allowing a calling party to respond to the generated request, etc. The display unit 606 comprises, for example, a liquid crystal display, a plasma display, an organic light emitting diode (OLED) based display, etc. The input devices 607 are used for inputting data into the computer system 600. The calling party uses the input devices 607 to provide a response to the generated request to the call completion application 202, for example, by selecting call completion actions on the GUI 201a for completing the detected incomplete call. The input devices 607 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc.

Computer applications and programs are used for operating the computer system 600. The programs are loaded onto the fixed media drive 608 and, in an embodiment, into the memory unit 602 of the computer system 600 via the removable media drive 609. In an embodiment, the computer applications and programs may be loaded directly via the network 205. Computer applications and programs are executed by double clicking a related icon displayed on the display unit 606 using one of the input devices 607. The output devices 610 output the results of operations performed by the call completion application 202. For example, the call completion application 202 renders and displays the generated request to the calling party using the output devices 610.

The processor 601 executes an operating system, for example, the Linux® operating system, the Unix® operating system, any version of the Microsoft® Windows® operating system, the Mac OS of Apple Inc., the IBM® OS/2, VxWorks® of Wind River Systems, inc., QNX Neutrino® developed by QNX Software Systems Ltd., the Palm OS®, the Solaris operating system developed by Sun Microsystems, Inc., the Android™ operating system of Google, Inc., the Windows Phone® operating system of Microsoft Corporation, the BlackBerry® operating system of Research in Motion Limited, the iOS® operating system of Apple Inc., the Symbian® operating system of Symbian Foundation Limited, etc. The computer system 600 employs the operating system for performing multiple tasks. The operating system is responsible for management and coordination of activities and sharing of resources of the computer system 600. The operating system further manages security of the computer system 600, peripheral devices connected to the computer system 600, and network connections. The operating system employed on the computer system 600 recognizes, for example, inputs provided by the calling party using one of the input devices 607, the output display, files, and directories stored locally on the fixed media drive 608, for example, a hard drive. The operating system on the computer system 600 executes different programs using the processor 601. The processor 601 and the operating system together define a computer platform for which application programs in high level programming languages are written.

The processor 601 of the computer system 600 employed by the call completion application 202 retrieves instructions defined by the call detection module 202a, the action determination module 202b, the request generation module 202c, the request rendering module 202d, the response acquisition module 202e, the action execution module 202f, etc., of the call completion application 202 for performing respective functions disclosed in the detailed description of FIG. 2. The processor 601 retrieves instructions for executing the modules, for example, 202a, 202b, 202c, 202d, 202e, 202f, etc., of the call completion application 202 from the memory unit 602. A program counter determines the location of the instructions in the memory unit 602. The program counter stores a number that identifies the current position in the program of each of the modules, for example, 202a, 202b, 202c, 202d, 202e, 202f, etc., of the call completion application 202. The instructions fetched by the processor 601 from the memory unit 602 after being processed are decoded. The instructions are stored in an instruction register in the processor 601. After processing and decoding, the processor 601 executes the instructions, thereby performing one or more processes defined by those instructions.

At the time of execution, the instructions stored in the instruction register are examined to determine the operations to be performed. The processor 601 then performs the specified operations. The operations comprise arithmetic operations and logic operations. The operating system performs multiple routines for performing a number of tasks required to assign the input devices 607, the output devices 610, and memory for execution of the modules, for example, 202a, 202b, 202c, 202d, 202e, 202f, etc., of the call completion application 202. The tasks performed by the operating system comprise, for example, assigning memory to the modules, for example, 202a, 202b, 202c, 202d, 202e, 202f, etc., of the call completion application 202, and to data used by the call completion application 202, moving data between the memory unit 602 and disk units, and handling input/output operations. The operating system performs the tasks on request by the operations and after performing the tasks, the operating system transfers the execution control back to the processor 601. The processor 601 continues the execution to obtain one or more outputs. The outputs of the execution of the modules, for example, 202a, 202b, 202c, 202d, 202e, 202f, etc., of the call completion application 202 are displayed to the calling party on the display unit 606.

For purposes of illustration, the detailed description refers to the call completion application 202 being run locally on the computer system 600; however the scope of the method and the system 200 disclosed herein is not limited to the call completion application 202 being run locally on the computer system 600 via the operating system and the processor 601, but may be extended to run remotely over the network 205 by employing a web browser and a remote server, a mobile phone, or other electronic devices. One or more portions of the computer system 600 may be distributed across one or more computer systems (not shown) coupled to the network 205.

Disclosed herein is also a computer program product comprising a non-transitory computer readable storage medium that stores computer program codes comprising instructions executable by at least one processor 601 for completing an incomplete call made by the calling party to the called party. The computer program product comprises a first computer program code for detecting an incomplete call from a calling party device 201 to a called party device 206, where the incomplete call is an unanswered call or a call that is not connected to the called party device 206, or a short duration call; a second computer program code for determining one or more of multiple call completion actions to be performed to complete the detected incomplete call; and a third computer program code for triggering execution of the determined call completion actions based on one or more action execution criteria for completing the detected incomplete call. The computer program product disclosed herein further comprises a fourth computer program code for generating a request defining call completion actions for completing the detected incomplete call; a fifth computer program code for rendering the generated request on the GUI 201*a* of the calling party device 201; and a sixth computer program code for receiving a response to the generated request from the calling party device 201 via the GUI 201*a*. The third computer program code triggers the execution of the call completion actions determined from the received response based on one or more of the action execution criteria for completing the detected incomplete call.

The second computer program code determines one or more of the call completion actions to be performed to complete the detected incomplete call based on one or more of the configurable criteria comprising, for example, user configuration of the call completion application 202 on the calling party device 201, etc. The computer program product disclosed herein further comprises a seventh computer program code for determining a mode of transmission of media data from the calling party device 201 to the called party device 206 via the network 205 based on the received response and one or more of the action execution criteria. The computer program product disclosed herein further comprises one or more additional computer program codes for completing an incomplete call made by the calling party to the called party. In an embodiment, a single piece of computer program code comprising computer executable instructions performs one or more steps of the method disclosed herein for completing the incomplete call made by the calling party to the called party.

The computer program codes comprising computer executable instructions are embodied on the non-transitory computer readable storage medium. The processor 601 of the computer system 600 retrieves these computer executable instructions and executes them. When the computer executable instructions are executed by the processor 601, the computer executable instructions cause the processor 601 to perform the steps of the method for completing the incomplete call made by the calling party to the called party.

It will be readily apparent that the various methods, algorithms, and computer programs disclosed herein may be implemented on computer readable media appropriately programmed for computing devices. As used herein, the term "computer readable media" refers to non-transitory computer readable media that participate in providing data, for example, instructions that may be read by a computer, a processor or a similar device. Non-transitory computer readable media comprise all computer readable media, for example, non-volatile media, volatile media, and transmission media, except for a transitory, propagating signal. Non-volatile media comprise, for example, optical discs or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to a processor, etc. Common forms of computer readable media comprise, for example, a floppy disk, a flexible disk, a hard disk, magnetic tape, a laser disc, a Blu-ray Disc®, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

The computer programs that implement the methods and algorithms disclosed herein may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of programming languages that can be used comprise C, C++, C#, Objective-C, Java®, JavaScript®, Fortran, Ruby, Pascal, Perl®, Python®, Visual Basic®, hypertext preprocessor (PHP), Microsoft® .NET. Other object-oriented, functional, scripting, and/or logical programming languages may also be used. The computer program codes or software programs may be stored on or in one or more mediums as object code. Various aspects of the method and the system disclosed herein may be implemented as programmed elements, or non-programmed elements, or any suitable combination thereof.

The present invention can be configured to work in a network environment comprising one or more computers that are in communication with one or more devices via a network. The computers may communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, some examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, some examples of which are disclosed above. While the operating system may differ depending on the type of computer, the operating system will continue to provide the appropriate communications protocols to establish communication links with the network. Any number and type of machines may be in communication with the computers.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for completing an incomplete call made by a calling party to a called party, comprising:
   providing a call completion application executable by at least one processor on a calling party device;
   detecting said incomplete call made by said calling party to said called party, by said call completion application on said calling party device, wherein said incomplete call is a call that is not connected to a called party device due to occurrence of one or more of a plurality of events;
   receiving one or more of a plurality of call completion actions to be performed by said call completion application on said calling party device to complete said detected incomplete call, wherein said plurality of call completion actions are selected according to one or more responses provided by said calling party through a graphical user interface of said calling party device, wherein said call completion actions comprise setting a reminder to call back said called party at a configurable time, recording media data on said calling party device, transmitting said media data to a called party device, transmitting a missed call alert to said called party device, transmitting a notification of said detected incomplete call to said called party device, transmitting a notification on availability of said called party, transmitting said media data to a social networking platform, transmitting an automated message requesting said called party to call back said calling party when available, and any combination thereof; and
   triggering execution of said received one or more of said call completion actions by said call completion application on said calling party device based on one or more of action execution criteria for said completion of detected incomplete call.

2. The computer implemented method of claim 1, wherein said events comprise said called party being busy, said called party device being in an out of coverage area, said called party device being unreachable, said called party device being switched off, network congestion, and said call not being answered by said called party.

3. The computer implemented method of claim 1, wherein said incomplete call is a call of a short duration that does not enable an intended communication to occur between said calling party and said called party.

4. The computer implemented method of claim 1, wherein said one or more of said call completion actions are received by said call completion application based on a duration of said detected incomplete call.

5. The computer implemented method of claim 1, wherein said action execution criteria comprise configuration of said call completion actions on said calling party device, one of a presence and an absence of one or more of a message box and a messaging application for receiving media data on one of a network account of said called party and a called party device, one of a presence and an absence of a data connection from said calling party device to a network, one of a presence and an absence of a messaging service in a network component of said called party, one of a presence and an absence of a messaging service in a network component of said calling party, reach of said messaging service to deliver said media data to one of said network component of said called party and said called party device, network options provided to said calling party device and said called party device by said network to which said calling party device and said called party device are connected, and call completion preferences configured by said call completion application on said calling party device.

6. The computer implemented method of claim 1, wherein said one or more of said call completion actions to be performed by said call completion application on said calling party device to complete said detected incomplete call is based on one or more of configurable criteria configured by said calling party.

7. The computer implemented method of claim 6, wherein said configurable criteria configured by said calling party comprise call settings configured on said calling party device, network characteristics, and device characteristics.

8. The computer implemented method of claim 1, wherein said media data comprises one of text data, audio data, video data, audiovisual data, image data, multimedia data, message data, and any combination thereof.

9. The computer implemented method of claim 1, further comprising determining a mode of transmission of media data from said calling party device to a called party device via a network, by said call completion application on said calling party device based on one or more of said action execution criteria.

10. The computer implemented method of claim 1, further comprising monitoring said incomplete call by said call completion application on said calling party device as said incomplete call progresses from said incomplete call being initiated, said incomplete call being one of answered and rejected, and said incomplete call being terminated.

11. A computer system for completing an incomplete call made by a calling party to a called party, comprising:
   a non-transitory computer readable storage medium configured to store a call completion application on a calling party device;
   at least one processor communicatively coupled to said non-transitory computer readable storage medium, said at least one processor configured to execute said call completion application on said calling party device; and
   said call completion application on said calling party device, comprising:
      a call detection module configured to detect said incomplete call made by said calling party to said called party;
      an action determination module configured to receive one or more of a plurality of call completion actions to be performed to complete said detected incomplete call wherein said plurality of call completion actions are selected according to one or more responses provided by said calling party through a graphical user interface of said calling party device, and wherein said call completion actions comprise setting a reminder to call back said called party at a configurable time, recording media data on said calling party device, transmitting said media data to a called party device, transmitting a missed call alert to said called party device, transmitting a notification of said detected incomplete call to said called party device, transmitting a notification on availability of said called party, transmitting said media data to a social networking platform, transmitting an automated message requesting said called party to call back said calling party when available, and any combination thereof; and an action execution module configured to trigger execution of said received one or more of said call completion actions based on one or more of action execution criteria one or more responses selected by said calling party for said completion of said detected incomplete call.

12. The computer system of claim 11, wherein said incomplete call is a call that is not connected to a called party device due to occurrence of one or more of a plurality of events, wherein said events comprise said called party being busy, said called party device being in an out of coverage area, said called party device being unreachable, said called party device being switched off, network congestion, and said call not being answered by said called party.

13. The computer system of claim 11, wherein said incomplete call is a call of a short duration that does not enable an intended communication to occur between said calling party and said called party.

14. The computer system of claim 11, wherein said action determination module is further configured to receive said one or more of said call completion actions based on a duration of said detected incomplete call.

15. The computer system of claim 11, wherein said action execution criteria comprise configuration of said call completion actions on said calling party device, one of a presence and an absence of one or more of a message box and a messaging application for receiving media data on one of a network account of said called party and a called party device, one of a presence and an absence of a data connection from said calling party device to a network, one of a presence and an absence of a messaging service in a network component of said called party, one of a presence and an absence of a messaging service in a network component of said calling party, reach of said messaging service to deliver said media data to one of said network component of said called party and said called party device, network options provided to said calling party device and said called party device by said network to which said calling party device and said called party device are connected, and call completion preferences configured by said call completion application on said calling party device.

16. The computer system of claim 11, wherein said action determination module is further configured to receive said one or more of said call completion actions to be performed to complete said detected incomplete call based on one or more of configurable criteria, wherein said configurable criteria configured by said calling party comprise calling party device, call settings configured on said calling party device, network characteristics, and device characteristics.

17. The computer system of claim 11, wherein said media data comprises one of text data, audio data, video data, audio-visual data, image data, multimedia data, message data, and any combination thereof.

18. The computer system of claim 11, wherein said action execution module is further configured to determine a mode of transmission of media data from said calling party device to a called party device via a network based on one or more of said action execution criteria.

19. The computer system of claim 11, wherein said call detection module is further configured to monitor said incomplete call on said calling party device as said incomplete call progresses from said incomplete call being initiated, said incomplete call being one of answered and rejected, and said incomplete call being terminated.

20. A computer program product comprising a non-transitory computer readable storage medium, said non-transitory computer readable storage medium storing computer program codes that comprise instructions executable by at least one processor, said computer program codes comprising:

a first computer program code for detecting an incomplete call from a calling party device to a called party device, wherein said incomplete call is one of a call that is not connected to said called party device and a call of short duration;

a second computer program code for receiving one or more of a plurality of call completion actions to be performed to complete said detected incomplete call, wherein said plurality of call completion actions are selected according to one or more responses provided by said calling party through a graphical user interface of said calling party device, wherein said call completion actions comprise setting a reminder to call back said called party at a configurable time, recording media data on said calling party device, transmitting said media data to a called party device, transmitting a missed call alert to said called party device, transmitting a notification of said detected incomplete call to said called party device, transmitting a notification on availability of said called party, transmitting said media data to a social networking platform, transmitting an automated message requesting said called party to call back said calling party when available, and any combination thereof; and a third computer program code for triggering execution of said received one or more of said call completion actions based on one or more of action execution criteria for said completion of said detected incomplete call.

21. The computer program product of claim 20, wherein said action execution criteria comprise configuration of said call completion actions on said calling party device, one of a presence and an absence of one or more of a message box and a messaging application for receiving media data on one of a network account of a called party and said called party device, one of a presence and an absence of a data connection from said calling party device to a network, one of a presence and an absence of a messaging service in a network component of said called party, one of a presence and an absence of a messaging service in a network component of said calling party, reach of said messaging service to deliver said media data to one of said network component of said called party and said called party device, network options provided to said calling party device and said called party device by said network to which said calling party device and said called party device are connected, and call completion preferences configured on said calling party device.

22. The computer program product of claim 20, wherein said second computer program code is configured to receive said one or more of said call completion actions to be performed to complete said detected incomplete call based on one or more of configurable criteria, wherein said configurable criteria comprise user configuration of said call completion application on said calling party device, call settings configured on said calling party device, network characteristics, and device characteristics.

23. The computer program product of claim 20, wherein said computer program codes further comprise a seventh computer program code for determining a mode of transmission of media data from said calling party device to said called party device via a network based on one or more of said action execution criteria.

* * * * *